Figure 1:
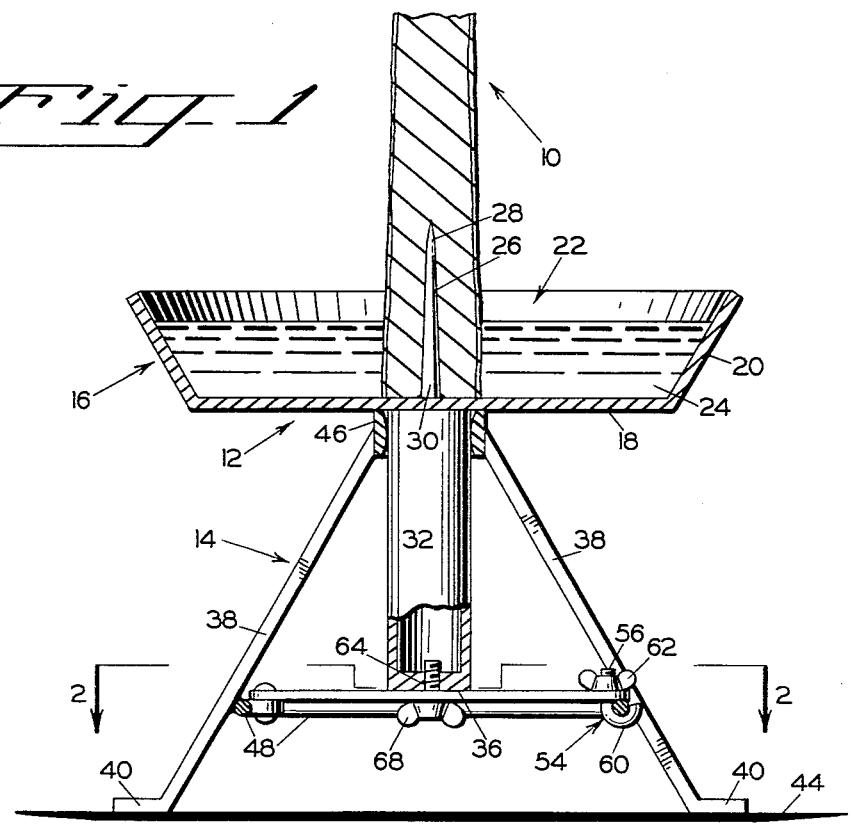

Aug. 4, 1964 F. F. KAPPELMAN 3,143,324
CHRISTMAS TREE HOLDERS
Filed Nov. 26, 1962

INVENTOR.
FRANCIS F. KAPPELMAN
BY *Kimmel & Crowell*
ATTORNEYS

United States Patent Office 3,143,324
Patented Aug. 4, 1964

3,143,324
CHRISTMAS TREE HOLDERS
Francis F. Kappelman, 7913 SE. Woodward St.,
Portland, Oreg.
Filed Nov. 26, 1962, Ser. No. 239,991
4 Claims. (Cl. 248—44)

This invention relates to an improvement in Christmas tree holders and relates more particularly to a device for supporting a Christmas tree or the like which avoids the necessity of severing the lower and bushier limbs of the tree as is necessary with Christmas tree holder known heretofore.

Numerous holders or stands have been used for supporting Christmas trees or the like wherein the tree trunk is supported by passing the same through a ring secured to a tripod or the like, having sets screws or other conventional adjustable means to circumferentially grip the trunk and a base plate on which to rest the bottom of the same. With such structures it is required that the limbs adjacent the bottom of the trunk be removed in order to allow a sufficient length of trunk to be inserted through the supporting ring. These limbs are usually among the fullest and most beautiful and severance of the same decreases the aesthetic value of the Christmas tree and reduces the portion of the tree available for decoration.

A further disadvantage of Christmas tree holders conventionally used heretofore is that it is difficult if not virtually impossible to vertically align the tree within the stand for purposes of appearance and sound structural support and to assist in preventing the decorations from falling from the limbs.

It is an object of the instant invention to provide a Christmas tree holder free from the foregoing and other disadvantages.

Another object of this invention is the provision of a device of the character described having a reservoir or the like adapted to contain a quantity of water adjacent the base of the tree trunk to assure freshness of the tree throughout the holiday season.

A further object of this invention is to provide such a device having a unit which acts as an extension of the tree trunk and which may be used in conjunction with any conventional stand to support the tree without necessitating severance of the lower limbs thereof.

Another object of this invention is to provide a base element adapted to receive the aforementioned tree trunk extension and allowing for vertical positioning of the tree with a minimum of effort and a maximum of accuracy.

A still further object of this invention is to provide a device of the character described which is simple and inexpensive to manufacture and sturdy and efficient in operation.

Other and further objects reside in the combination of elements, arrangement of parts and features of construction.

Still other objects will in part be obvious and in part be pointed out as the description of the invention proceeds and as shown in the accompanying drawing wherein there are disclosed preferred embodiments of this inventive concept.

Figure 2:
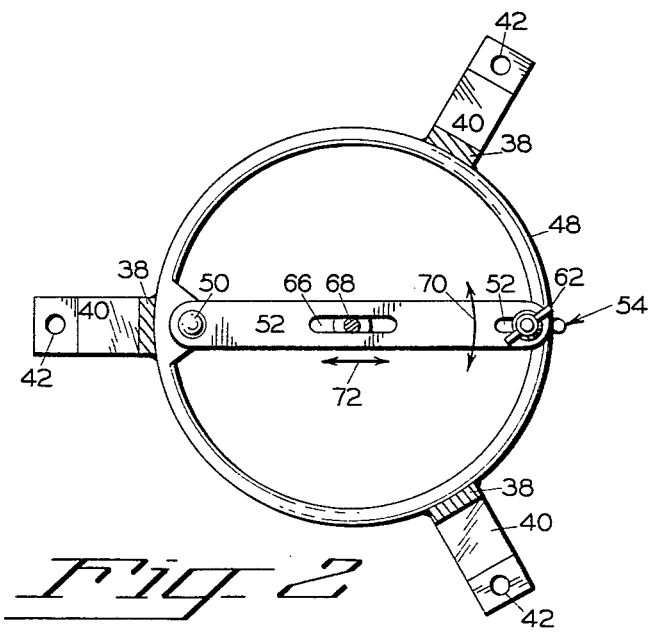

In the drawing:

FIGURE 1 is a front elevational view of the device of the instant invention, partly in cross-section and partly broken away for illustrative convenience; and FIGURE 2 is a transverse cross sectional view taken along line 2—2 of FIGURE 1.

Referring now to the drawing and more particularly to FIG. 1, reference numeral 10 indicates generally the trunk portion of a Christmas tree or the like. The device of the instant invention is formed basically of two elements, an upper tree supporting element indicated generally at 12 and a lower base element indicated generally at 14.

The upper tree supporting element 12 is designed to be used with any conventional stand or base element but will be most advantageously used with the base element 14 of the instant invention as pointed out further hereinafter.

The tree supporting element 12 is comprised of a tray 16 having a base plate 18 and an upwardly and outwardly extending peripheral wall 20 which together form a reservoir 22 adapted to contain a quantity of water 24. An elongated tree trunk holding spike 26 has an upper pointed end 28 and a lower end 30 secured approximately in the geometrical center of the base plate 18 of the tray 16. A tree trunk extension member 32 has an upper end 34 which is secured to the lower surface of the base plate 18 of the tray 16 and is aligned with and oppositely disposed to the tree trunk holding spike 26. It is to be noted that the tree trunk extension member 32 is preferably cylindrical in form to approximate the shape of the average tree trunk thereby allowing the same to be inserted into, and supported by a conventional stand or base element in the manner in which the tree trunk is normally supported.

The bottom end 36 of the tree trunk extension member 32 is formed into an anvil portion to assist in driving the tree trunk holding spike 26 longitudinally into the center of the tree trunk by striking the anvil portion 36 in an obvious manner. The tree trunk holding spike 26 is sufficiently strong and of sufficient length to hold, or support, the tree without any additional aid.

If desired, any spacing means pervious to water such as a screen or the like may surround the lower end 30 of the tree trunk holding spike 26 to assist in allowing the water 24 to be absorbed by the tree trunk 10.

The preferred stand or base element 14 to be used with the hereinbefore described supporting element 12 is comprised of a plurality of supporting legs 38, three being shown for illustrative convenience, each having an outwardly disposed foot member 40 at its lower extremity with a securing hole or the like 42, to be used if desired to anchor the base element 14 to the flooring 44. Secured at the upper extremity of the legs 38 is a means indicated generally at 46 adapted to circumscribe the tree trunk extension member 32 and pivotally support the same for adjustment in a manner to be described in more detail hereinafter.

Suitably located on the inside surface of the legs 38 and secured thereto is an aligning ring 48 which acts as a bracing member for the legs 38 and, more important, forms a part of the vertical aligning mechanism for the tree 10. Pivotally mounted at 50 on the aligning ring 48 is an elongated aligning bar 52 diametrically traversing the aligning ring 48. Note particularly FIGURE 2. The aligning bar 52 is adjustably secured to the opposite side of the aligning ring 48 by a J-shaped positioning bolt indicated generally at 54 having an upwardly disposed threaded portion 56 insertable through an elongated slot 58 in the end of the aligning bar 52 and an arcuate bottom portion 60 adapted to circumscribe the aligning ring 48. A wing nut 62 may be threadably secured over the portion 56 of the bolt 54 to adjustably attach the aligning bar 52 to the aligning ring 48.

The bottom end 36 of the tree trunk extension member 32 has a threaded bore 64 defined therein. Approximately midway between the ends of the aligning bar 52 another elongated slot 66 is defined through which a threaded wing bolt 68 may be inserted to adjustably secure the tree trunk extension member 38 to the aligning bar 52.

The use and operation of the device of the instant invention will now be apparent. With the wing bolt 68 removed from the threaded bore 64 in the base of the tree trunk extension member 32, the tree trunk may be attached to the tree supporting element 12 by driving the tree trunk holding spike 26 through the base thereof in the manner hereinbefore described. When this assembly is to be used with the base element 14 of the instant invention, the tree trunk extension member 32 is merely inserted through the means 46 and loosely secured through the elongated slot 66 of the aligning bar 52 by the wing bolt 68. With particular reference to FIG. 2, the tree trunk extension member 32, and thereby the tree, may be aligned in the vertical position by simply moving the aligning bar 52 about its pivot 50 in the direction of the double headed arrow 70 and/or moving the tree trunk extension member 32 with respect to the aligning bar 52 in the direction of the double headed arrow 72. When the tree is positioned as desired, the wing bolt 68 and the wing nut 62 may be firmly tightened to retain the same in the adjusted position.

The water 24 is then added to the reservoir and the erection of the tree is completed.

It will now be seen that there is herein provided a device which accomplishes all of the objects of the instant invention and others including many advantages of great practical utility and commercial importance.

Since many embodiments may be made of this inventive concept and since many modifications may be made of the embodiments hereinbefore shown and described, it is to be understood that all matter herein is to be interpreted as merely illustrative and not in a limiting sense.

I claim:

1. A stand for a tree having an elongated tree trunk and a plurality of limbs outwardly extending therefrom, said stand comprising a base plate having an upper surface and a lower surface, an elongated tree trunk holding spike having an upper pointed end and a lower end, said lower end of said tree trunk holding spike being secured to said upper surface of said base plate, said tree trunk holding spike extending upwardly therefrom, an elongated downwardly extending tree trunk extension member having an upper end and a lower end, said upper end of said tree trunk extension member being secured to said bottom surface of said base plate and said tree trunk extension member being longitudinally aligned with said tree trunk holding spike, a base element having a plurality of supporting legs, means secured to said legs and adapted to circumscribe said tree trunk extension member and pivotally support the same adjacent the top end thereof and aligning means to adjustably pivot said tree trunk extension member about said last-mentioned means whereby said tree trunk may be vertically aligned, said aligning means including an aligning ring secured to said supporting legs below said bottom end of said tree trunk extension member, an elongated aligning bar having two ends, one end of said aligning bar being pivotally secured to said aligning ring, means defining a first elongated slot intermediate the ends of said aligning bar, means defining a second elongated slot adjacent the other end of said aligning bar, said aligning bar being sufficient in length for extending to a point on said aligning ring diametrically opposed to the point where said one end is pivotally secured thereto, means defining a threaded bore in the bottom end of said tree trunk extension member, a wing bolt insertable through said first slot and said threaded bore to adjustably secure said tree trunk extension member in relation to said aligning bar, a J-shaped bolt having a threaded end insertable through said second slot and an arcuate portion adapted to circumscribe said aligning ring and a wing nut threadable onto said threaded end of said J-shaped bolt to adjustably secure said aligning bar in relation to said aligning ring.

2. A stand in accordance with claim 1 wherein said base plate has an upwardly extending peripheral wall secured thereto, said peripheral wall and said upper surface of said base plate defining a reservoir adapted to contain a quantity of water.

3. A stand in accordance with claim 1 wherein said lower end of tree trunk extension is provided with an anvil portion to assist in driving said pointed end of said tree trunk holding spike into said tree trunk.

4. A stand for a tree having an elongated tree trunk comprising a base element having a plurality of supporting legs, an aligning ring secured to said supporting legs, an elongated aligning bar having two ends, one end of said aligning bar being pivotally secured to said aligning ring, said aligning bar being sufficient in length for extending to a point on said aligning ring diametrically opposed to the point where said one end is pivotally secured thereto, means connecting said tree trunk to said aligning bar intermediate the ends of said aligning bar, means secured to said supporting legs in spaced relationship above said aligning ring and operatively connected to said tree trunk to pivotally support the same, and an adjusting means slidingly connecting the other end of said aligning bar to said aligning ring.

References Cited in the file of this patent
UNITED STATES PATENTS

| | | |
|---|---|---|
| 806,402 | Donnelly | Dec. 5, 1905 |
| 1,579,275 | Zeigler | Apr. 6, 1926 |
| 2,455,025 | Schroeder | Nov. 30, 1948 |
| 2,893,668 | Applegate | July 7, 1959 |